W. H. RICH.
TOOL FOR RAZING BUILDINGS, SCAFFOLDS, AND ANALOGOUS WORK.
APPLICATION FILED FEB. 11, 1918.
1,270,970.
Patented July 2, 1918.
2 SHEETS—SHEET 1.
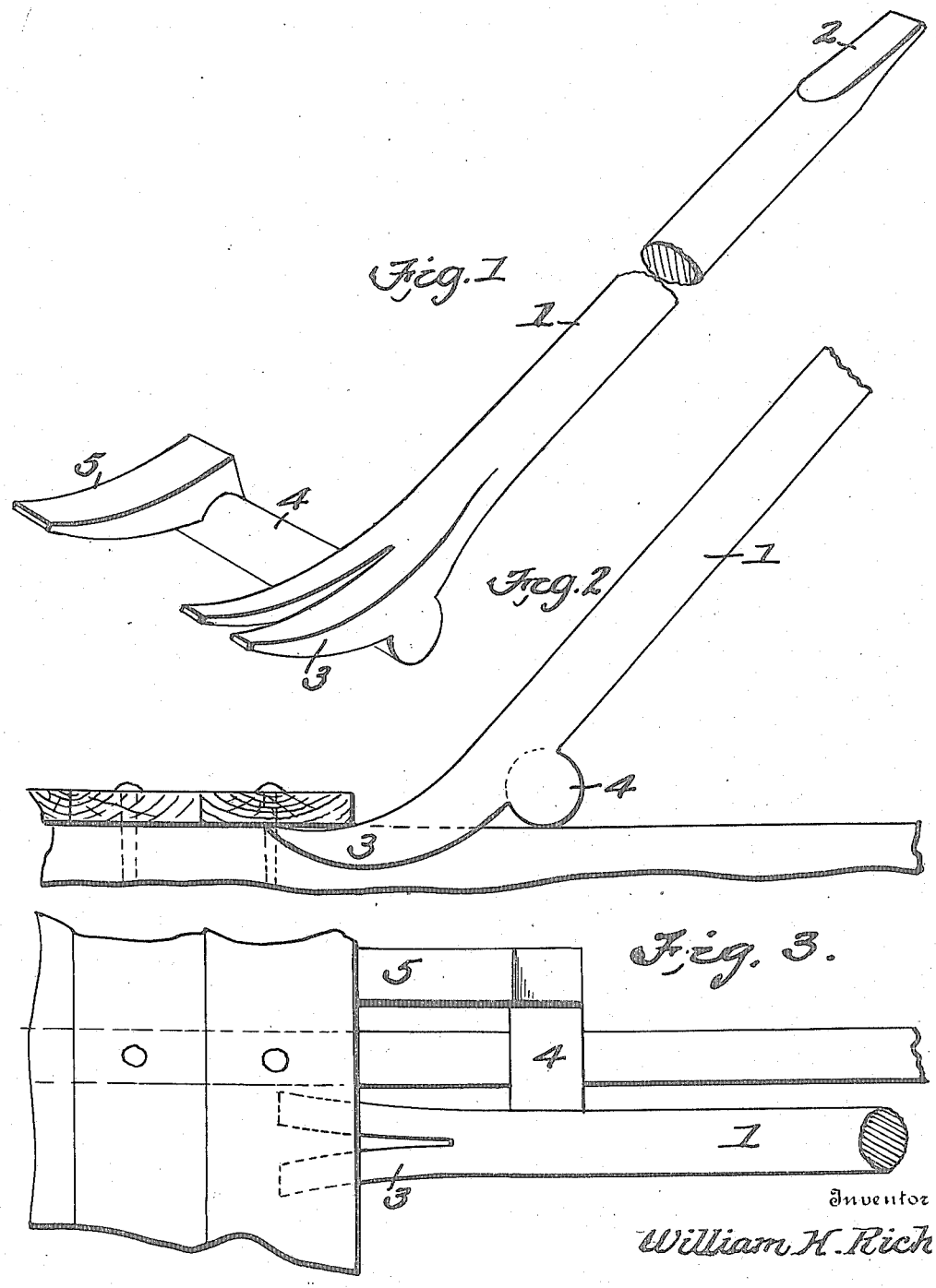

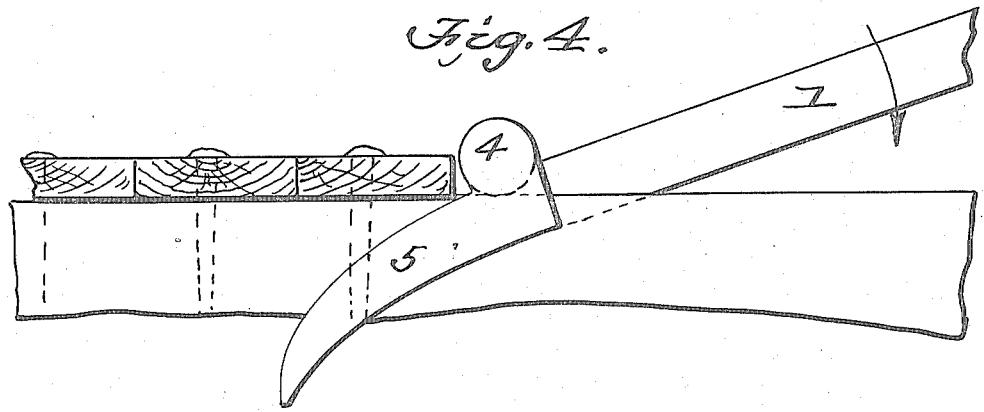
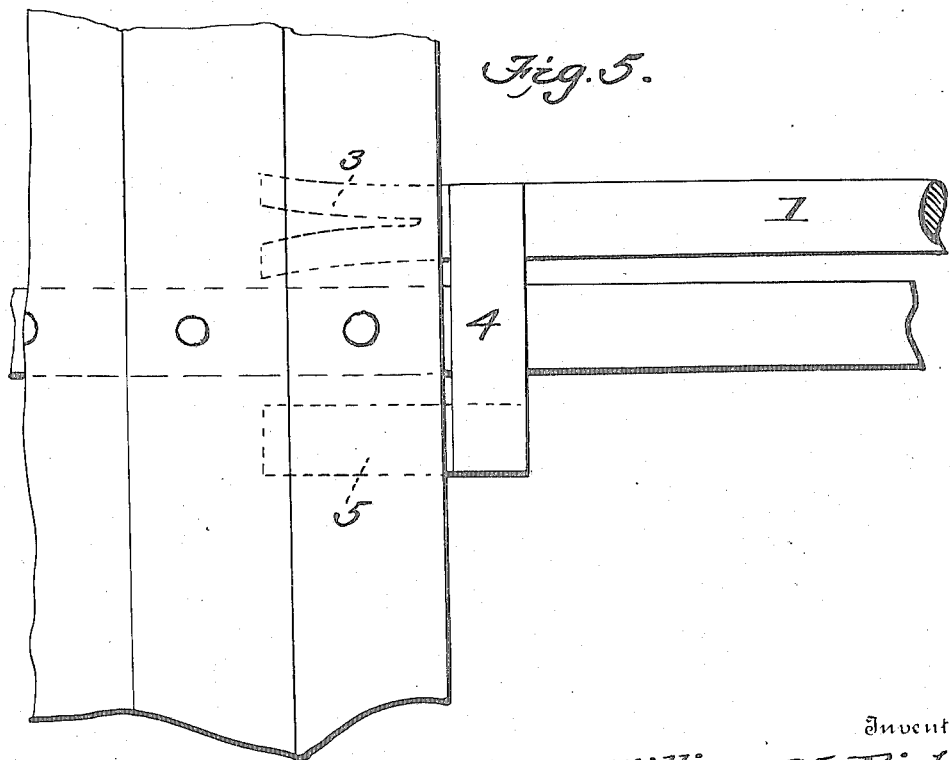

UNITED STATES PATENT OFFICE.

WILLIAM HENRY RICH, OF WRENTHAM, MASSACHUSETTS.

TOOL FOR RAZING BUILDINGS, SCAFFOLDS, AND ANALOGOUS WORK.

1,270,970. Specification of Letters Patent. Patented July 2, 1918.

Application filed February 11, 1918. Serial No. 216,519.

*To all whom it may concern:*

Be it known that I, WILLIAM HENRY RICH, a citizen of the United States, residing at Wrentham, in the county of Norfolk and State of Massachusetts, have invented certain new and useful Improvements in Tools for Razing Buildings, Scaffolds, and Analogous Work, of which the following is a specification.

The object of this invention is to provide a tool especially adapted for use in razing buildings, scaffolds, and analogous work wherein it is desirable to separate the various pieces of lumber without splitting or otherwise injuring the same so that the several pieces of lumber may be used over again.

The invention comprises a handle having one end terminating in a wedge-shape portion and its opposite end provided with a claw formed with a head, the construction and arrangement being such that the tool may be so operated whereby to permit further movement of the handle member of the tool over such devices heretofore employed, and the construction and arrangement being also such that the tool may be reversed whereby to facilitate its use in restricted areas.

The invention further comprises certain novel details of construction as will be hereinafter fully described and then claimed.

In the drawings, illustrating the invention, in the several figures of which like parts are similarly designated, Figure 1 is a perspective view of my improved implement. Fig. 2 is a side elevation of the same showing the practical application of the same. Fig. 3 is a plan view. Fig. 4 is a side elevation of the implement illustrating the application of its use in a reversed direction from that shown in Fig. 2. Fig. 5 is a plan view of the arrangement shown in Fig. 4.

1 designates the handle portion of my improved implement having its outer end provided with a wedge-shape portion 2, and its opposite end terminating in a claw 3 which serves as a nail-extractor, and which is adapted to extract nails or spikes after they have been "started" from the parts which they have united. The claw 3 is of the usual shape as that of the ordinary nail extracting claws of hammers and like tools. The handle 1 is provided at its forward end, adjacent to the base of the claw 3, with a lateral extension 4, which extends from the lower side of the inner end of the claw 3, and is circular in cross section. The outer end of the extension 4 is formed with a forwardly extending finger 5 having its lower and upper faces formed in parallel relation with that of the lower and upper faces of the claw 3, so that when leverage is applied to the handle 1, pressure will be exerted equally upon either the upper or lower faces of the claw 3 and the finger 5, as will be hereinafter more fully explained.

Applicant is aware that tools of this class have been provided in connection with razing buildings, scaffolds, and other constructions, but applicant provides a novelty in such implements in that, by arranging the handle member of the tool at one end of, what might be termed the head, he is able to obtain a greater movement of the handle than is possible with such tools having the handle arranged centrally of the head, since the movement of the handle is naturally limited owing to its coming into contact with the joists or any vertical or horizontal beam which is straddled by the head of the implement. It will be appreciated that by applicant's construction such a movement is not limited, and that the movement of the handle member and the consequent plying powers of the claw are not limited. Furthermore, it will be appreciated that by arranging the member 4 upon the lower faces of the claw 3 and the finger 5, a fulcrum is provided which affords greater movement and a greater leverage than devices wherein the extensions are extended from the vertical sides of the claw members of the head.

Furthermore, as illustrated in Fig. 4, it will be appreciated that applicant's implement is adapted to be reversed so that in places of restricted areas the lower surfaces of the claw 3 and the finger 5 may be more conveniently inserted under the board of a flooring, scaffolding, or sheathing of a building so that the element being operated upon may be more conveniently disconnected from its support than by any of the devices now in common use.

It will be noted that the upper and lower surfaces of the claw 3 and the finger 5 are arranged in the same parallel plane, or, in other words, concentric so that when pressure is applied upon the handle 1, an equal strain will be applied upon the work so as to extract the nail, for instance, when the implement is employed for lifting flooring or sheathings of a building, or for disassembling scaffoldings such as are employed in the erection of buildings.

From the foregoing, it is believed that applicant's invention provides an improvement over similar instruments heretofore provided.

What I claim is:—

1. An implement of the kind described, comprising a handle member having a claw at one end and a lateral extension extending from the lower face of said claw, and a finger portion having its upper and lower surfaces similarly formed with respect to the upper and lower faces of said claw.

2. An implement of the kind described, comprising a handle having one end terminating in a claw having its upper and lower surfaces upwardly inclined and tapering, said claw having a lateral extension formed upon and extending from the lower face thereof and formed integral therewith, and a finger portion carried by and extending from the upper surface of said lateral extension, said finger portion being similarly formed with respect to the claw end of said handle.

In testimony whereof I have hereunto set my hand this 22d day of January, A. D. 1918.

WILLIAM HENRY RICH.

Witnesses:
FLORENCE M. BLANCHARD,
CHAUNCEY S. DYER.